United States Patent [19]
Dargent

[11] Patent Number: 5,552,683
[45] Date of Patent: Sep. 3, 1996

[54] METHOD OF CONTROLLING A REVERSIBLE ELECTRIC DEVICE

[75] Inventor: Thierry Dargent, Nozay, France

[73] Assignee: Aerospatiale Societe Nationale Industrielle, France

[21] Appl. No.: 198,505

[22] Filed: Feb. 18, 1994

[30] Foreign Application Priority Data

Feb. 23, 1993 [FR] France ................................ 9302050

[51] Int. Cl.$^6$ ................................................ G05B 11/28
[52] U.S. Cl. ......................... 318/287; 318/283; 318/281; 318/256
[58] Field of Search ...................... 318/257, 254, 318/287, 135, 294, 138, 139, 681, 599, 280, 290, 294, 281, 285, 291, 293, 256; 363/63, 56

[56] References Cited

U.S. PATENT DOCUMENTS

| | | | |
|---|---|---|---|
| 4,066,945 | 1/1978 | Korte, Jr. ........................ | 318/681 |
| 4,514,666 | 4/1985 | Suzuki . | |
| 4,562,393 | 12/1985 | Loyzim et al. .................... | 318/257 |
| 5,032,772 | 7/1991 | Gully et al. ...................... | 318/135 |
| 5,150,264 | 9/1992 | Nakabayashi ..................... | 360/71 |
| 5,257,175 | 10/1993 | Skelton et al. ................... | 363/56 |
| 5,272,428 | 12/1993 | Spiegel et al. . | |

FOREIGN PATENT DOCUMENTS 0259005  9/1988  European Pat. Off. .

*Primary Examiner*—John W. Cabeca
*Attorney, Agent, or Firm*—Remy J. VanOphem; John VanOphem; Thomas A. Meehan

[57] ABSTRACT

A reversible electric device M is connected in an H bridge with a first side formed by first top and bottom switches and a second side formed by second top and bottom switches. The current Im flowing in the device from the first side to the second side is determined cyclically with a given constant switching frequency. The difference Δ is determined between Im and an instantaneous set point current. Each cycle is divided with a ratio R into a first part and a second part. R is determined and for each part a set point setting for the switches (diagonal mode or freewheel mode) is chosen according to the sign Δ, the sign of the set point current (or of Im) and the value of a preselected correlation law relating to Δ the mean value of the voltage that can be applied to the device during each cycle.

11 Claims, 4 Drawing Sheets

| $S_1$  $S_4$ $S_2$  $S_3$ | C = 1   $I_{co} > I_m$ | | | | C = 0   $I_{co} < I_m$ | | | |
|---|---|---|---|---|---|---|---|---|
| | A = 1 | | A = 0 | | A = 1 | | A = 0 | |
| B = 1  $I_{co} > 0$ | 1 | 0 | 0 | 0 | 1 | 0 | 0 | 1 |
| | 0 | 1 | 1 | 1 | 0 | 1 | 1 | 0 |
| B = 0  $I_{co} < 0$ | 1 | 0 | 0 | 1 | 0 | 0 | 0 | 1 |
| | 0 | 1 | 1 | 0 | 1 | 1 | 1 | 0 |

Fig.5

| $\Delta = I_{co} - I_m$ | C = 1 | C = 0 |
|---|---|---|
| B = 1 | $R = k * \Delta$ | $R = 0,5 + k/2 * \Delta$ |
| B = 0 | $R = 0,5 + k/2 * \Delta$ | $R = 1 + k * \Delta$ |

METHOD OF CONTROLLING A REVERSIBLE ELECTRIC DEVICE

BACKGROUND OF THE INVENTION

1. Field of the Invention

The invention concerns the control of an electric motor or any other electrical driving and/or generating device (transformer, etc.) using current loop control and employing an "H bridge" type switch mode amplifier.

2. Description of the Prior Art

One example of such an amplifier is shown in FIG. 1 in which T1, T2, T3 and T4 are solid-state switches (usually transistors), M is the electric motor in question (or one phase of the motor in the case of a multiphase motor) and I is the current in the motor. A reverse biased diode is connected to each switch. The upper and lower terminals of the H bridge are connected to maximum potentials, respectively.

To control the electric device M at the center of the bridge a control logic unit C determines according to the measured current and the instantaneous value of the set point (or control) current the setting for each of the four switches and the times for which these settings are maintained.

There are two conventional ways to control these bridges:

either so-called "diagonal" control in which the switches operate in diagonally opposite pairs expressed in logical notation as T1=T3=T2=T4 (Ti is the logical complement of Ti, Ti=1 if switch i is on, Ti=0 if switch i is off), or so-called "freewheel" control from the top or the bottom: in the case of freewheel control from the bottom, for example, there are two forms of the control logic dependent on the direction of the control current: T1=0, T2=1, T3=T4 (negative current), and T1=T2, T3=1, T4=0 (positive current).

If T3=1 (negative current) of T2=1 (positive current) no potential is applied to the motor which therefore "freewheels", explaining the name given to this mode of control.

These two types of control are described in U.S. Pat. No. 4,581,565 which first describes the diagonal control mode and its drawbacks and then discloses, for eliminating those drawbacks, a special H bridge and a specific embodiment of the freewheel control mode.

The diagonal control mode involves switches in constant duration cycles: during a first part of this cycle the switches of one diagonal are turned on (the other diagonal being off) and then during a second part of this cycle complementary to the first part the switches of the other diagonal are turned on (and those of the first diagonal are turned off). The fraction obtained by dividing the duration of the first part by the total cycle duration is chosen according to the instantaneous difference between the set point current and the measured current, this measured current being the current flowing through the motor. U.S. Pat. No. 4,581,565 teaches the following measures to alleviate the drawbacks of this type of control: firstly, measuring the current flowing between the maximum and minimum potentials, instead of the current flowing through the motor, and, secondly, employing cycles of variable duration, applying the voltage difference between the maximum and minimum potentials to the motor if the measured current is less than the set point current and selecting freewheel mode for a specified duration immediately after the measured current exceeds the set point.

Diagonal switching provides a current loop which operates perfectly in all configurations of the motor, whether it is in fact operating as a motor (FIG. 2a) or as a generator (FIG. 3a), because the potential is applied to the motor at all times, in one direction or the other. The drawback of this mode of operation is that it creates a high level of current ripple (this is also related to the switching frequency) and therefore losses due to the Joule effect and generates high iron losses even when the motor is stationary (null current set point).

On the other hand, switching with freewheeling at the top or the bottom of the bridge provides a current loop which limits current ripple and iron losses (no voltage is applied to the motor when it is freewheeling) which leads to a slower variation in the current (FIG. 2b). However, in practice the current is not controlled during phases in which the motor operates as a generator, i.e. there are situations in which runaway of the motor can occur until the current becomes saturated (see FIG. 3b). One way to avoid this saturation (see previously mentioned U.S. Pat. No. 4,581,565) is to turn off all the transistors of the bridge for a specific time, but there is then no control over the current: there is thus a transient phase during which the current loop is no longer functional, which causes problems if this loop is integrated into a more general system. Note also (see FIG. 2b) that the small decrease in the current under steady state conditions (which reduces the amplitude of the ripple as compared with FIG. 2a) is achieved at the cost of a slower decrease than in FIG. 2a if the set point is suddenly reduced.

An object of the invention is to alleviate the aforementioned drawbacks of both types of control mode and is directed to a control method procuring a low level of ripple in the case of a steady state set point current combined with a fast variation in the instantaneous current in the event of a sudden variation (in particular reduction) of the set point current, with no risk of uncontrolled runaway of the electric device under current overload conditions, and with no risk of premature wear of the electric device.

SUMMARY OF THE INVENTION

To this end the invention proposes a method of controlling a reversible electric device in which the electric device is connected to first and second center terminals of an H bridge having a first side formed by a first top switch T1 and a first bottom switch T2 connected in series between a maximal potential line and a minimal potential line, a second side formed by a second top switch T4 and a second bottom switch T3 connected in series between the potential lines, and a reverse-biased diode shunting each switch. The first center terminal is connected between the first switches and the second center terminal is connected between the second switches. According to the method of the present invention, the current Im flowing in the electric device from the first side to the second side is measured cyclically with a given constant switching frequency, the difference $\Delta$ between an instantaneous set point current and the measured current is determined, and then, depending on the difference $\Delta$, each switching period $T_C$ is divided with a cyclic ratio R into a first part and a complementary second part, R denoting the ratio between the duration of the first part and the total cycle duration, and for each part a set point setting is determined for each switch after which the switches are set to the set point settings.

A correlation law F is chosen between the ratio required for each cycle between the mean voltage Um applied to the device during the cycle and the voltage $U_A$ between the maximal and minimal potential lines and the difference $\Delta$ such that $Um/U_A = F(\Delta)$.

Either the measured current or the set point current is selected as a current reference I.

R is computed and the settings of the switches are determined according to the instantaneous value of Δ and the instantaneous sign of I in the three following cases:

* if I > 0 and Δ > 0:

R = F(Δ) if 0 ≦ F(Δ) ≦ 1
R = 0 if F(Δ) < 0
R = 1 if F(Δ) > 1
T1 = T3 = 1 ; T2 = T4 = 0 during the first part,
T1 = T4 = T2 = T3 during the second part,
* if I < 0 and Δ < 0:

R = 1 + F(Δ) if 0 ≦ 1 + F (Δ) ≦ 1
R = 0 if 1 + F(Δ) < 0
R = 1 if 1 + F(Δ) > 1
T1 = T4 = T2 = T3 during the first part,
T1 = T3 = 0 ; T2 = T4 = 1 during the second part,
* if I and Δ are of opposite sign:

R = (1 + F(Δ))/2 if 0 ≦ (1 + F(Δ))/2 ≦ 1
R = 0 if (1 + F(Δ))/2 < 0
R = 1 if (1 + F(Δ))/2 > 1
T1 = T3 = 1 ; T2 = T4 = 0 during the first part,
T1 = T3 = 0 ; T2 = T4 = 1 during the second part.

The invention cleverly combines some of the teachings of the two control modes previously mentioned, recognizing the inevitable relationships between R and F according to whether diagonal control or freewheel control is in use at a given time: when the reference current is positive and the difference between the controlled current and the measured current is positive or the reference current is negative and the difference between the controlled current and the measured current is negative, freewheel control is adopted and R varies in proportion to F, whereas immediately the reference current and the difference between the controlled current and the measured current are of opposite sign, diagonal control is adopted and R varies in portion proportion to F/2.

According to preferred features of the invention, some of which can be combined:

the controlled current is chosen as the reference current;
a linear form:

$$U_m/U_A k*\Delta$$

is chosen for F where k is a positive real number;
if
*I>0 and Δ>0, T1=T4=0 during the second part;
*I<0 and Δ<0, T1=T4=0 during the first part;
this defines a "freewheel from the bottom" mode; and alternatively, T1=T4=1 can be chosen in the same circumstances, which defines a "freewheel from the top" mode.

Objects, features and advantages of the invention emerge from the following description given by way of non-limiting example with reference to the appended drawings.

BRIEF DESCRIPTION OF THE DRAWINGS

FIG. 5 is a table showing the configurations of the switches from FIG. 4 according to the logic values of parameters A, B and C representing the part of the switching cycle under consideration and the sign of the set point current and the value of the measured current relative to the set point current;

FIG. 6 is a table showing the relationships between R and F for the various logical values of B and C;

DETAILED DESCRIPTION OF THE PREFERRED EMBODIMENT

Figure 1:
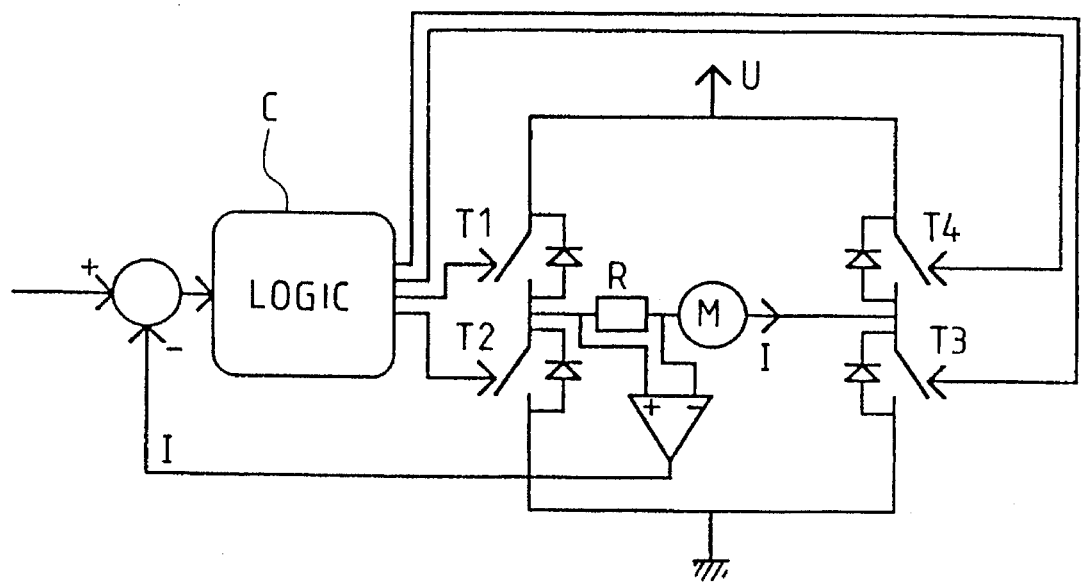
FIG. 1 is a block diagram of a motor in a known type H bridge switch mode amplifier.
Figure 4:
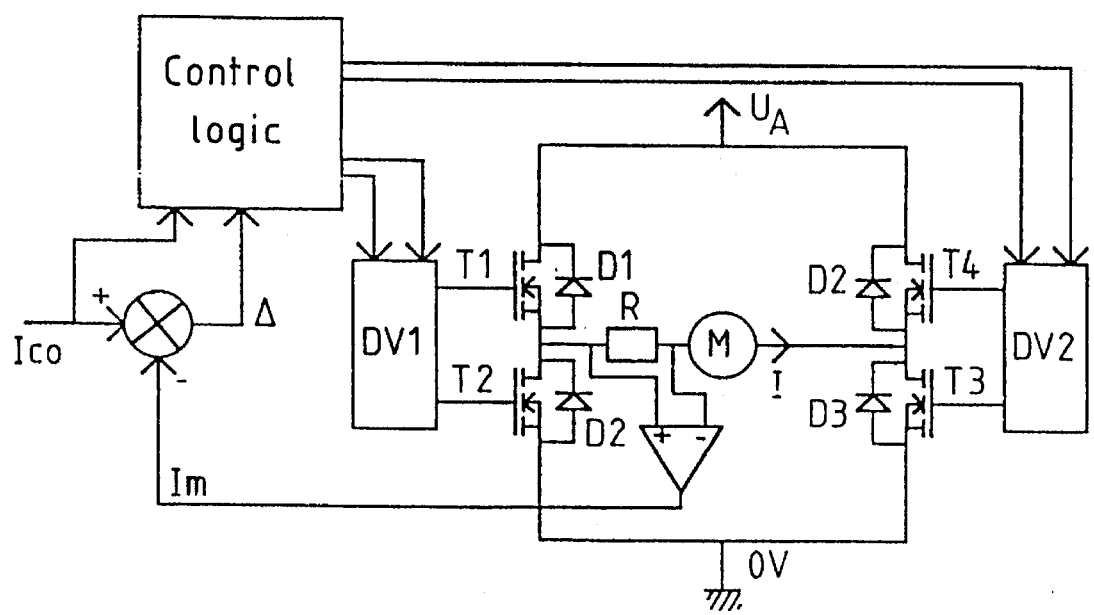
FIG. 4 is a block diagram of an H bridge switch mode amplifier adapted to implement a method according to the invention.
Figure 2A:
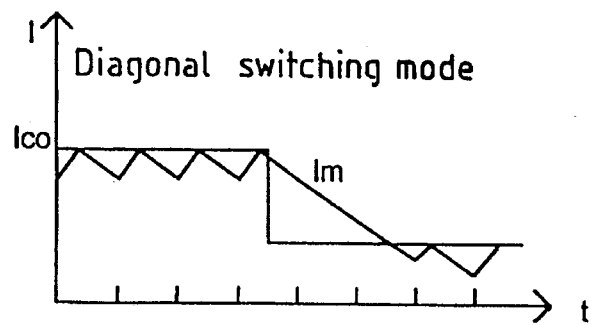
FIGS. 2a and 2b are graphs showing the variation in the current I in the motor from FIG. 1, respectively with diagonal control and freewheel control, when the motor operates as a motor.
Figure 2B:
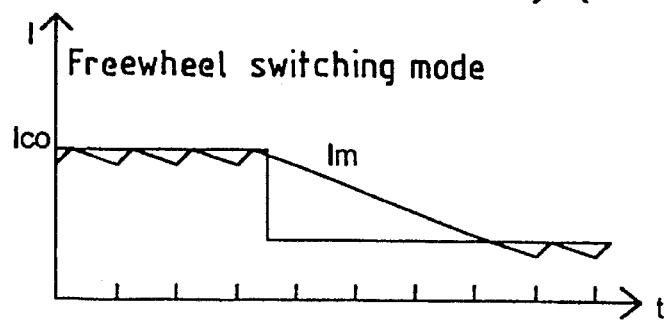
Figure 3A:
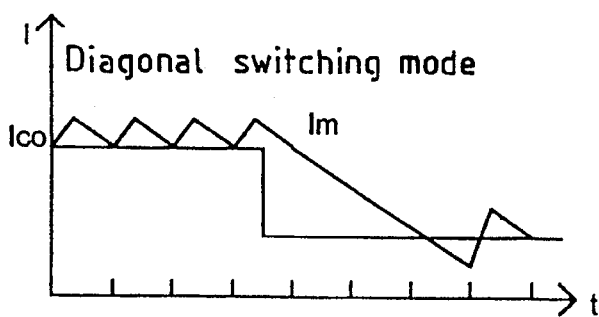
FIGS. 3a and 3b are graphs similar to those of FIGS. 2a and 2b but for the situation in which the motor operates as a generator.
Figure 3B:
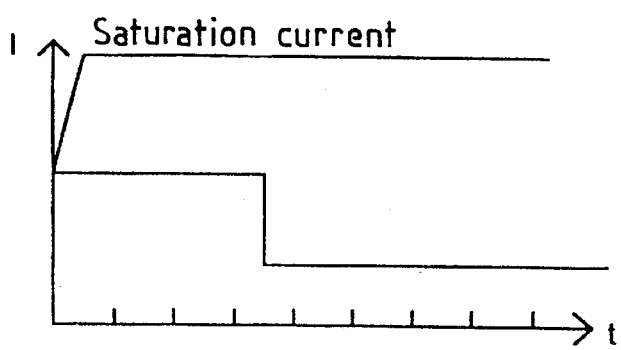
Figure 7:
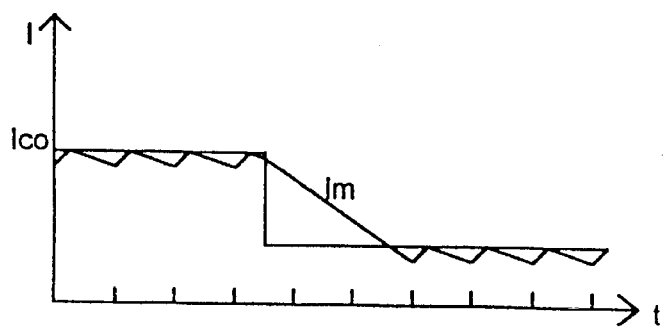
FIG. 7 is a diagram similar to FIGS. 2a and 2b showing in diagrammatic form the behavior of the amplifier from FIG. 1 when implementing the method of the invention.

FIG. 4 is a block diagram of an H bridge switch mode amplifier adapted to implement the method of the invention. This circuit includes:

an electric device M, in this example a brush (commutator) type DC motor;

an H bridge with the motor at its center, embodying four power switches T1, T2, T3, T4 of any known type (for example MOSFET power transistors and associated IR 2110 type drivers DV1 and DV2) and four reverse-biased diodes D1, D2, D3 and D4 of any known type for recirculating the current connected to these transistors; in practice these diodes can be integrated into the switches;

any system supplying an indication Im as to the current flowing in the motor (here, for example, a shunt resistor R in series with the motor and associated with a measurement differential amplifier);

control logic which controls the power switches and which receives as an information input the controlled current Ico and the difference between the controlled current Ico and the measured current Im; and a generator (not shown) adapted to apply to the terminals of the bridge a supply voltage $U_A$.

The control logic system has a number of functions:

it captures and shapes at a predetermined constant cycle frequency defining cycles of duration $T_C$ the system control signals, i.e. Ico and the difference signal Δ=(Ico−Im). In the usual way, by shaping of the control signals is here meant any processing of the input information or a combination of the two (amplification, offset, comparison, filtering, integration, etc.);

it applies pulse width modulation to the difference signal Δ using any known system. To be more precise, it determines the modulation cyclic ratio R defining the division of each cycle $T_C$ into first and second parts; according to the invention, this parameter R is a function of Ico (or of Im) and Δ. In the case of a linear control current loop, this function is "switch mode" linear; and it determines the control mode to use according to the input information. The changeover criterion is simple:

if the measured current is less than or equal to the controlled current for a positive controlled current or if the measured current is greater than the controlled current for a negative controlled current, then the H bridge switch control logic mode is the freewheel mode (the freewheel can be from the top or the bottom of the H bridge, depending on additional constraints (possibly variable constraints) that can exist in a practical implementation); if the measured current is greater than the controlled current for a positive controlled current or if the measured current is less than the controlled current for a negative controlled current, then the H bridge switch control logic is the diagonal mode.

FIG. 5 shows one example of the logic in the case where the DC motor M is subject to linear current control, the freewheel mode being from the bottom. This logic is defined by means of the following variables:

A is the logic output of the modulator per pulse width (A=1 for the first part of the cycle and A=0 during the remainder of this cycle). $T_C$ is the period of the modulator per pulse width and $T_A$ is the time during the cycle for which A=1; the ratio $R=T_A/T_C$ defines the cyclic ratio of the modulator: ($R\epsilon[0,1]$)

i.e. the fraction of the cycle accounted for by its first part.
B is the sign of Ico:
B=1 if Ico>0, B=0 if Ico≦0.
C is the sign of Δ (Ico−Im):
C=1 if Δ>0, C=0 if Δ≦0.
$S_1$, $S_2$, $S_3$, $S_4$ are the logic states of the switches T1, T2, T3, T4: if $S_i$=1 then Ti is on.

The control logic can be defined by the following equations:

$S_1 = \overline{A}*(B+C)$ $S_2 = A + (B+\overline{C})$ $S_3 = \overline{A} + B*C$ $S_4 = A*\overline{B}*\overline{C}$ where $\overline{A}$ is the logical complement of A,
* is the AND logic operator, and
+is the OR logic operator.

The cyclic ratio R can be defined as follows, using a preset parameter k (see FIG. 6):
if B=C=1
R=k*Δ if k*Δ is between 0 and 1 (inclusive)
R=1 if k*Δ>1
the case k*Δ<0 is not possible here because the gain
k is a real positive number and Δ>0.
if B=C=0
R=1+k*Δ if 1+k*Δ is between 0 and 1 (inclusive)
R=0 if 1+k*Δ less than 0
the case (1+k*Δ)>1 is not possible here because the gain k is a real positive number and Δ<0.
if B=C
R=(1+k*Δ)/2 if (1+k*Δ)/2 is between 0 and 1 (inclusive)
R=0 if (1+k*Δ)/2<0
R=1 if (1+k*Δ)/2>1

Um is the mean voltage applied to the terminals of the motor M during a cycle.

In the first of the above cases (freewheel control):
Um=R*$U_A$ whence, substituting for R:
Um=k*$U_A$*Δ (where Um ∈ [−$U_A$, $U_A$])

In the second case (freewheel control):
Um=(R−1)*$U_A$ whence, substituting for R:
Um=k*$U_A$*Δ

In the third case (diagonal control):
Um=(2*R−1)*$U_A$ whence, substituting for R:
Um=k*$U_A$Δ

Note that combining the data from FIGS. 5 and 6 yields the same correlation law between Um and Δ. This combination therefore guarantees continuity of the average value of the voltage at the terminals of the motor independently of the instantaneous control mode, which guarantees correct operation of the control system and of the motor.

k is a dimensionless coefficient which determines in the above example the proportional control gain:

k∈]0+∞[.k must be chosen according to the required performance and so as to ensure that the loop is stable.

The proportional control described here is by way of example only, any other control law appropriate to the control problem as stated being a feasible alternative.

Thus R can be determined from any choice of correlation law F between Um/$U_A$ and Δ such that Um/$U_A$=F(Δ).

This conservation of the mean value makes it possible to determine R for each of the aforementioned cases:
B=C=1: R=F(Δ) (or R=0 or 1 if F (Δ) is out of the range)
B=C=0: R=1+F(Δ) (or R=0 or 1 if 1+F(Δ) is out of the range)
B=C: R=(1+F(Δ))/2 (or R=0 or 1 if 1+F(Δ))/2 is out of the range).

Figure 8:
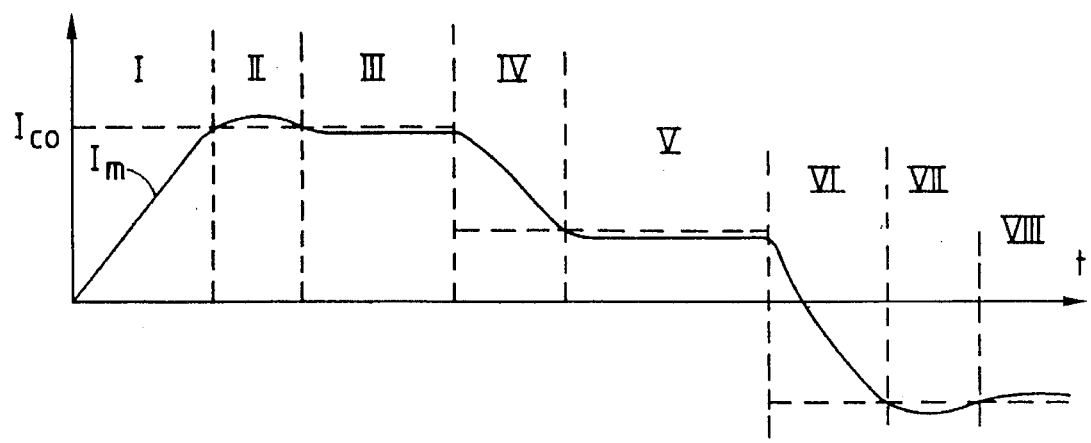
FIG. 8 is a real life example of the variation of Im as a function of a set point current following a staircase law.
Figure 9:
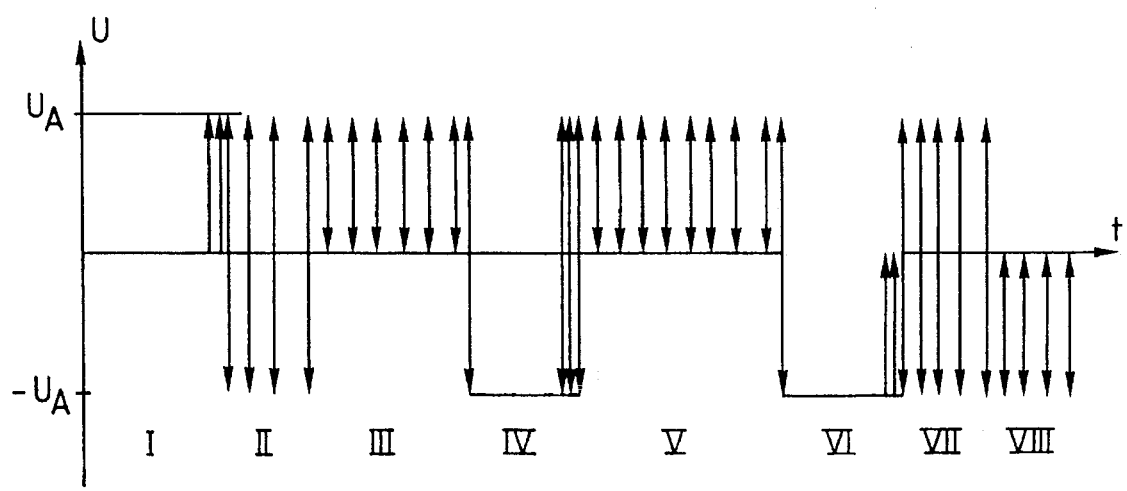
FIG. 9 is a graph showing the amplitude of the voltages applied to the motor during the various phases of the FIG. 8 curve.

FIG. 8 shows a curve imposed on Ico and the resulting curve for Im. FIG. 9 shows the amplitude of possible variation for the voltage applied to the motor.

The increasing current phase I represents the freewheel mode (B=C=1) with a voltage either equal to $U_A$ or equal to 0 (in fact the voltage remains at $U_A$ if R remains at 1).

At the end of this increasing current phase, Im can tend towards Ico, remaining less than the latter, in which case the freewheel mode is retained. However, if the gain is high Im crosses Ico in which case (phase II) the diagonal mode is selected (B=1; C=0) until Im falls below Ico again, whereupon the freewheel mode is selected again (B=C=1; phase III).

If Ico is suddenly reduced (phase IV) the diagonal mode is reselected (B=1; C=0) until Im stabilizes below Ico (B=C=1), phase V, during which the freewheel mode is selected again.

If Ico is suddenly reduced to the point that it becomes negative (phase IV, B=C=0) the freewheel mode is retained until Im falls below Ico (phase VII) in which case the diagonal mode is reselected and then the freewheel mode (phase VIII).

FIG. 9 includes vertical arrows for each of the aforementioned phases with staircase stabilization and R between 0 and 1 (exclusive), with horizontal lines in phases in which R remains at one extreme value 0 or 1. The curve includes successive changes and it is only by virtue of the aforementioned indications for defining R as a function of B, C and F(Δ) that the value Um can vary continuously.

It goes without saying that the above description has been given by way of non-limiting example only and that numerous variants can be put forward by one skilled in the art without departing from the scope of the invention.

In particular, there is no significant departure from the general spirit of the invention if, in FIG. 5, B denotes not the sign of the Ico but that of Im. In FIG. 8 this change would merely divide phase VI into a diagonal control phase followed by a freewheel control phase, which would have substantially no effect on the curves in FIGS. 8 and 9 if R remained at one of its limiting values (high value of K); on the other hand, the choice of the diagonal mode at the start of phase VI could have the advantage, in the case of a low absolute value of k*Δ (i.e. a value of R between 0 and 1, exclusive), of reducing Im more quickly towards 0. Note also that to retain the freewheel control mode throughout phase VI by taking Im as the reference current it is necessary to split into two parts the cases where B=C of FIG. 5, according to the sign of Ico, which would amount to taking Ico as the reference current.

Also, if for any reason it is preferable for the freewheel mode to be from the top, nothing in the foregoing would be significantly changed, the equations for the switches becoming:

$S_1 = A + (B*C)$ $S_2 = A*(B*C)$ $S_3 = A*(B+C)$ $S_4 = A + (B+C)$

Finally, what has been stated above can easily be generalized to the case of a multiphase electric device, where what is stated above applies to each of the phases.

What is claimed is:

1. A method for controlling a current being applied to a reversible electric device having an input and an output, said method comprising the steps of:

providing an H bridge having a positive terminal and a negative terminal connected to said reversible electric device;

connecting a first center terminal of said H bridge to said input of said reversible electric device and connecting a second center terminal of said H bridge to said output of said reversible electric device, connecting a first top switch of said H bridge between said input of said reversible electric device and said positive terminal of said H bridge, connecting a second top switch of said H bridge between said output of said reversible electric device and said positive terminal of said H bridge, connecting a first bottom switch of said H bridge between said input of said reversible electric device and said negative terminal of said H bridge, and connecting a second bottom switch between said output of said reversible electric device and said negative terminal of said H bridge;

determining a measured current ($I_m$) running through said reversible electric motor;

setting an instantaneous set point current ($I_{co}$);

determining a current difference ($\Delta$) between said instantaneous set point current ($I_{co}$) and said measured current ($I_m$);

selecting a control logic means having a first input from said instantaneous set point current, a second input from said current difference, a first output line connected to said first top switch for transferring a first control signal to said first top switch, a second output line connected to said second top switch for transferring a second control signal to said second top switch, a third output line connected to said first bottom switch for transferring a third control signal to said first bottom switch, and a fourth output line connected to said second bottom switch for transferring a fourth control signal to said second bottom switch;

using said control logic means to calculate each of said first, second, third, and fourth control signals to control said reversible electric device;

selecting a switching frequency determining successive cycles having a constant switching period Tc, wherein said step of calculating each of said first, second, third, and fourth control signals for transferring to said switches further comprises for each cycle of said successive cycles the steps of:

defining a reference current I having a value selected from the set of said instantaneous set point current and said measured current;

determining $U_a$ as a difference in electrical potential between said positive terminal and said negative terminal of said H bridge;

applying a mean voltage ($U_m$) to said reversible electric device;

selecting a correlation law F by the equation:

$F(\Delta) = U_m/U_a$;

selecting T1, T2, T3, and T4 as binary values of said first, second, third, and fourth control signals, respectively, wherein said first control signal turns said first top switch on when T1=1 and off when T1=0, wherein said second control signal turns said second top switch on when T2=1 and off when T2=0, wherein said third control signal turns said first bottom switch on when T3=1 and off when T3=0, wherein said fourth control signal turns said second bottom switch on when T4=1 and off when T4=0, and wherein T1, T2, T3, and T4 are the binary logical complements of T1, T2, T3, and T4;

dividing said cycle into a first part and a second part, said cycle having a cycle duration, said first part of said cycle defining a first part duration;

determining a cyclic ratio R, said cyclic ratio being a ratio of said first part duration and said cycle duration; and determining binary values for T1, T2, T3, and T4 for said first part and for said second part based upon said reference current (I) and said current difference ($\Delta$) as follows:

if I>0 and $\Delta$>0, then
R=F($\Delta$) if 0<F($\Delta$)<1,
R=0 if F($\Delta$)<0,
R=1 if F($\Delta$)>1,
T1=T3=1 and T2=T4=0 during said first part of said switching period Tc, and
T1=T4=T2=T3 during said second part of said switching period Tc;
if I<0 and $\Delta$<0:
R=1+F($\Delta$) if 0<1+F($\Delta$)<1,
R=0 if 1+F($\Delta$)<0,
R=1 if 1+F($\Delta$)>1,
T1=T4=T2=T3 during said first part, and
T1=T3=0 and T2=T4=1 during said second part; and
if I and $\Delta$ are of opposite sign, then
R=(1+F($\Delta$))/2 if 0<(1+F($\Delta$))/2<1,
R=0 if (1+F($\Delta$))/2<0,
R=1 if (1+F($\Delta$))/2>1,
T1=T3=1 and T2=T4=0 during said first part, and
T1=T3=0 and T2=T4=1 during said second part.

2. The method according to claim 1 further comprising the step of defining said reference current to have a value equal to said instantaneous set point current.

3. The method according to claim 1 further comprising the step of selecting a linear form:

$[Um/U_A = K*] U_m/U_A = k*$ for said correlation law F where k is a positive real number.

4. The method according to claim 1 further comprising the step of selecting T1 and T4 wherein if I>0 and Δ>0, then T1=T4=0 during said second part, I<0 and Δ<0, then T1=T4=0 during said first part.

5. The method according to claim 1 further comprising the step of selecting T1 and T4 wherein if I>0 and Δ>0, then T1=T4=1 during said second part, I<0 and Δ<0, then T1=T4=1 during said first part.

6. The method according to claim 1 further comprising the step of providing a transistor for each said first and second top switch and each said first and second bottom switch, each said transistor having a collector, an emitter, and a base.

7. The method according to claim 6 wherein said step of providing each of said transistors includes the step of providing a driver circuit connected to said transistors.

8. The method according to claim 6 wherein said step of providing each of said transistors includes providing a diode connected between said collector and said emitter for recirculating a current connected to each of said transistors.

9. The method according to claim 6 further comprising the steps of:

providing a diode connected between said collector and said emitter for recirculating a current connected to each of said transistors; and providing a driver circuit.

10. The method according to claim 9 further comprising the step of integrating said transistors, said diodes, and said driver circuits into said switches.

11. The method according to claim 1 wherein said steps of connecting said first top switch, said second top switch, said first bottom switch, and said second bottom switch each further comprise the step of connecting a reverse biased diode across each said switch for respectively shunting said first top switch, said second top switch, said first bottom switch, and said second bottom switch.

* * * * *

UNITED STATES PATENT AND TRADEMARK OFFICE
CERTIFICATE OF CORRECTION

PATENT NO. : 5,552,683
DATED : September 3, 1996
INVENTOR(S) : Thierry Dargent

It is certified that error appears in the above-indentified patent and that said Letters Patent is hereby corrected as shown below:

Column 3, line 38, delete "portion".

Column 6, line 64, delete "K", insert ---- k ----.

Column 7, line 45, delete "motor", insert ---- device ----.

Signed and Sealed this

Twenty-seventh Day of May, 1997

Attest:

BRUCE LEHMAN

Attesting Officer

Commissioner of Patents and Trademarks